No. 875,054. PATENTED DEC. 31, 1907.
W. EACRETT.
CREDIT ACCOUNT FILING DEVICE.
APPLICATION FILED FEB. 23, 1907.
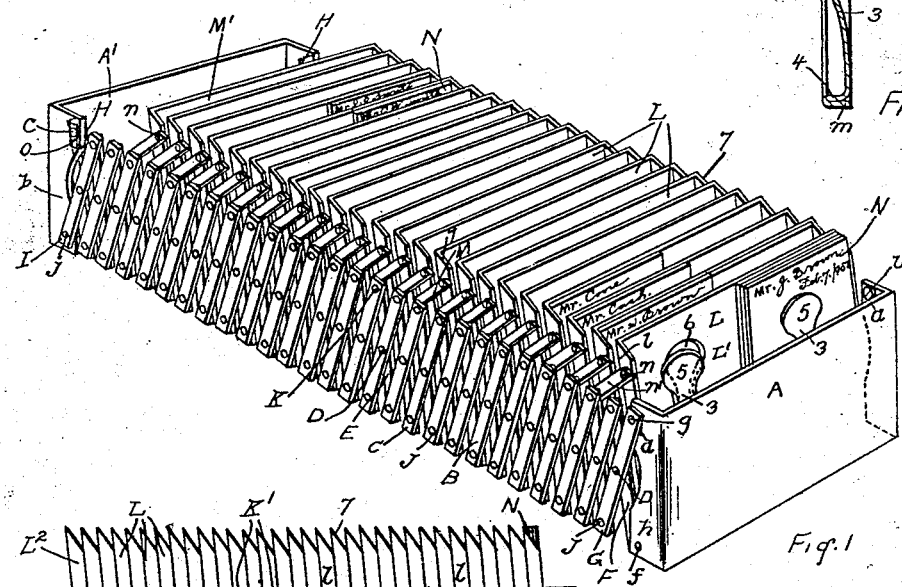
MODIFICATION.

UNITED STATES PATENT OFFICE.

WILLIAM EACRETT, OF TORONTO, ONTARIO, CANADA, ASSIGNOR OF ONE-HALF TO CHARLES W. SMITH, OF TORONTO, CANADA.

CREDIT-ACCOUNT-FILING DEVICE.

No. 875,054.　　　Specification of Letters Patent.　　　Patented Dec. 31, 1907.

Application filed February 23, 1907. Serial No. 358,832.

*To all whom it may concern:*

Be it known that I, WILLIAM EACRETT, a subject of the King of Great Britain, residing in the city of Toronto, in the county of York and Province of Ontario, Canada, merchant, have invented certain new and useful Improvements in Credit-Account-Filing Devices, of which the following is a specification.

My invention relates to improvements in credit account filing devices, and the object of my invention is to enable a store-keeper or other person to keep account of the daily sales made without having to resort to the usual book-keeping for that purpose, thereby reducing operating expenses and insuring absolute accuracy in accounts. When a customer makes a purchase, the duplicate of the original bill is placed in the desired supporting member or holder of the device, thereby having in convenient position the accounts for each customer. By opening the device the name of each customer carried by each bill is at once displayed before the operator in a compact yet very convenient form.

The construction and operation of my invention as embodied in different forms will be hereinafter described.

Figure 1 is a perspective view of my preferred form of credit account filing device, showing same opened out part way. Fig. 2 is a side elevation in closed or folded form of the credit account filing device shown in Fig. 1. Fig. 3 is an enlarged vertical section through one of the supporting members or holders, showing a clip or attaching member associated therewith for retaining the duplicate bills in place. Fig. 4 is a side elevation of an alternative form of my credit account filing device in extended form: This figure also shows a vertical longitudinal section through an extended slide or support for same, and Fig. 5 is a side elevation of the alternative form of credit account filing device shown in Fig. 4, when same is closed or folded up.

In the drawings, like characters of reference indicate corresponding parts in each figure.

I am aware that the prior state of the art shows a number of horizontally-supported trays or sections, controlled by levers or lazy tongs for the purpose of trunk or display or sample case manufacture, but none of these articles of manufacture are as compact as is my device, nor are they suitable for the purpose for which I have designed my credit account filing device.

My device is designed to be longitudinally extended and closed. The supporting members or holders placed one behind the other will, when the device is extended, be moved apart and made assume a backwardly inclined position so as to clearly expose the name of a customer on the duplicate sale slip or bill, or the contents of a card or character thereof held by the device.

Although by means of my device I get complete exposure of the name of the customer on the duplicate sale slip or bill, nevertheless when my device is closed up, it occupies very much less room than the devices before mentioned.

My device will be preferably stamped out of sheet metal, such as tin or copper or aluminium, but of course can be made out of any suitable material.

According to my preferred form of invention, I provide end members A and A¹, to each side of which are pivoted the lazy tongs B consisting of the front levers C pivoted at D to the corresponding back levers E. Except for the end levers F, G, H and I, each front lever C is pivoted at J, D, and K as by rivets or pins, to three of the back levers E. Upon inspecting the drawings it will be understood that the pivotal point D is intermediate the length of the levers C and E.

L are the supporting members or holders, preferably provided with side flanges $l$ and bottom flanges $m$: these supporting members or holders are placed between the lazy tongs and (with the exception of the supporting member or holder L¹) by means of the rivets or pins J (see dotted lines in Fig. 2) they are pivoted to the lower ends of the levers C and E.

In order to give the proper co-action between the lazy tongs and the supporting members or holders L, these supporting members or holders must be additionally supported by said lazy tongs: for this purpose I provide a plurality of links M pivoted at their upper ends by the pins or rivets $n$, to the side flanges $l$ of the supporting members or holders L, near their upper ends and pivoted by the pins or rivets K to the upper ends of the levers C and E.

When the device is extended or opened, it will be understood that the action of the lazy tongs together with the links M will throw the supporting members or holders L backward and thus display the name of the customer carried by the duplicate bills N.

Upon referring to Figs. 1 and 2, it will be seen that the end link $n^1$ is pivoted to the third member of the levers B from the right-hand end of the device. It will be understood by one skilled in this art, that the farther away the links M are pivoted to the lazy tongs from the supporting members or holders L, the quicker will be the movement of the said supporting members or holders when the device is opened or unfolded.

When my preferred form of device is fully opened or unfolded, the links M will occupy a substantially horizontal position, so therefore in order not to interfere with the movement of the rear or last supporting member or holder $M^1$, I extend the lazy tongs a sufficient distance beyond this supporting member or holder so that the end member $A^1$ will not interfere with its movement. The levers G, besides being pivoted at J and D to their two associated back levers E, are pivoted by the pin or rivet $g$ to the side $h$ of the end member A.

In order to permit of the necessary movement of the lazy tongs, the upper portions of the sides $h$ of the end member A are provided with vertical slots $a$ in which operate the pins or rivets $g$. These pins or rivets are provided with flared heads $i$ on their inner ends so as to assist in retaining the lazy tongs in place.

The levers F are pivoted at $f$ to the lower portion of the inside of the sides $h$ of the end member A, as is also the supporting member or holder $L^1$. The levers I are pivoted at $j$ to the lower portion of the sides $b$ of the end member $A^1$. The levers H are pivoted by the pins or rivets $c$ to the upper portion of the sides $b$ of the end member $A^1$, which pins or rivets $c$, operate in vertical slots O formed in the sides $b$, so as to permit of the operation of the lazy tongs. When the preferred form of my device is closed or folded, as shown in Fig. 2, the supporting members or holders L occupy a substantially vertical position.

I have shown the supporting members or holders L wide enough to accommodate two ordinary duplicate bills placed side by side, but it will of course be understood that the device can be constructed so as to so accommodate any number of bills. I utilize any device or means for retaining the duplicate bills or other article carried or supported by the supporting members or holders L in place: according to the means shown for this purpose, I show clips 3 stamped out from the supporting members or holders L and having a part of their lower portions 4 bent down upon the bottom flanges $m$, thus throwing the heads 5 of said clips down below the vacant portion 6 from which said head was stamped. As the heads 5 will be stamped wide enough so as to span the opening in the said supporting members or holders L from which the body portion of the clips have been stamped, it will be understood that the duplicate bills will be held by said clips in place. The stamping of these clips gives them approximately the configuration shown in Fig. 3, thereby causing their heads 5 to be spring-held against the supporting members or holders L.

In the alternative form of my device shown in Figs. 4 and 5, I dispense with the back levers E and the links M, and utilize the sides $l$ of the supporting members or holders L in place of the back levers E. By means of the pins or rivets $K^1$, the upper ends of the front levers B are pivoted to the side flanges $l$ and by means of the pins or rivets $J^1$, the ends of the front levers B (with the exception of the end of the lever I, which is pivoted at $j$ to the lower portion of the side $b$ of the end member $A^1$) are pivoted to the lower portions of the sides $l$ of the supporting members or holders L. By means of the rivets or pins $D^1$ the levers B are pivoted to the sides $l$ of the supporting members or holders L at a point equidistant between the pins or rivets $K^1$ and $J^1$. As in the preferred form, the supporting member or holder $L^1$ is pivoted at $f$ to the lower portion of the side $h$ of the end member A. The link G in my alternative form of device is pivoted at its upper end to the upper portion of the side $h$ of the end member A by the pin or rivet $g$ operating in the vertical slot $a$. The supporting member or holder $L^2$ is pivoted by the rivet or pin $c$ to the upper portion of the side $b$ of the end member $A^1$, which pin or rivet $c$ operates in a vertical slot O formed in the upper portion of said side $b$.

The upper portions of the side flanges $l$ are preferably cut off or rounded as shown at 7.

When my alternative form of device is closed or folded up, it will be understood upon referring to Fig. 5 that the supporting members or holders L will occupy an angle relative to a horizontal plane, for instance more acute than the angle occupied by the same members in my preferred form, when the preferred form of device is closed up: these latter holders occupy a right-angular or perpendicular position.

It will of course be understood by one skilled in this art, that I have used the terms horizontal and perpendicular merely for descriptive purposes relative to my device: the holders thereof must, at all times, occupy an angular position to the base upon which the device is supported or rests.

What I claim as my invention is:

1. A credit-account filing-device designed to be longitudinally extended and closed comprising a plurality of supporting-members or holders placed one behind the other, and means, such as a plurality of levers or bars designed essentially to be moved apart longitudinal of the device when the same is extended, associated with the lower and upper portions of said supporting members or holders whereby, as the device is longitudinally extended, the said means will be moved apart so as to move said supporting members or holders apart and make them assume a backwardly-inclined position, so as to clearly expose the heading of the contents carried thereby.

2. A credit-account filing-device designed to be longitudinally extended and closed, comprising a plurality of supporting-members or holders placed one behind the other, and a plurality of levers or bars pivoted together and pivoted to the lower portions of said supporting-members or holders and pivoted to the upper portions of said supporting-members or holders whereby, as the device is longitudinally extended, the said supporting-members or holders will be moved apart and made to assume a backwardly-inclined position so as to clearly expose the heading of the contents carried thereby.

3. A credit-account filing-device designed to be longitudinally extended and closed comprising two end members; a plurality of supporting-members or holders situated between said end members and one behind the other, and a plurality of levers or bars associated with said end members and pivoted to said supporting-members or holders at their lower portions and pivoted to said supporting-members or holders at their upper portions whereby, as the device is longitudinally extended, the said supporting-members or holders will be moved apart and made to assume a backwardly-inclined position so as to clearly expose the heading of the contents carried thereby.

4. A credit-account-filing-device designed to be longitudinally extended and closed, comprising two end members; a plurality of supporting-members or holders situated between said end members and one behind the other, and a plurality of levers or bars associated with said end members and pivoted to said supporting-members or holders at their lower portions and pivoted to said supporting-members or holders at their upper portions whereby, as the device is longitudinally extended, the said supporting-members or holders will be moved apart and made to assume a backwardly-inclined position so as to clearly expose the heading of the contents carried thereby, and retaining-means associated with said supporting-members or holders.

5. A credit account filing device designed to be longitudinally extended and closed, comprising two end members; a plurality of supporting members or holders situated between said end members and one behind the other; a plurality of levers or bars associated with said end members and with each other and with the lower portions of said supporting members or holders, and a plurality of links hinged to the top of the majority of pairs of said levers or bars, and near the top of said supporting members or holders so that as the device is longitudinally extended, the said supporting members or holders will be moved apart and made to assume a backwardly-inclined position so as to clearly expose the heading of the contents carried thereby.

6. A credit account filing device designed to be longitudinally extended and closed, comprising two end members; a plurality of supporting members or holders situated between said end members and one behind the other; a plurality of levers or bars associated with said end members and with each other and with the lower portions of said supporting members or holders; a plurality of links pivoted to the top of the majority of pairs of said levers or bars, and near the top of said supporting members or holders so that as the device is longitudinally extended, the said supporting members or holders will be moved apart and made to assume a backwardly-inclined position so as to clearly expose the heading of the contents carried thereby, and retaining means associated with said supporting members or holders.

7. A credit account filing device designed to be longitudinally extended and closed, comprising two end members; a plurality of supporting members or holders provided with side flanges $l$ and bottom flanges $m$, between said end members and one behind the other; a plurality of levers or bars pivoted together and at the bottom of the side flanges $l$ and pivoted to the said end members; a plurality of links pivoted to the top of the majority of pairs of said levers or bars and near the top of the side flanges $l$ of said supporting members or holders so that as the device is longitudinally extended, the said supporting members or holders will be moved apart and made to assume a backwardly-inclined position so as to clearly expose the heading of the contents carried thereby, and retaining means associated with said supporting members or holders.

8. A credit account filing device designed to be longitudinally extended and closed, comprising front and rear end members provided with sides in the upper portions of which are formed vertical slots; a plurality of supporting members or holders between said front and rear end members and one behind the other; a plurality of levers or bars pivoted together and to the bottom portions of said supporting members or holders; rivets or pins for pivoting the lower ends of the inwardly-extending levers or bars of the end pairs of levers or bars to the lower portions of the sides of said front and rear end members; rivets or pins secured in the upper portions of the outwardly-extending levers or bars of the end pairs of levers or bars and operating in the vertical slots in the upper portions of the sides of said front and rear end members, and a plurality of links pivoted to the top of the majority of pairs of the levers or bars and to said supporting members or holders so that as the device is longitudinally extended, the said supporting members or holders will be moved apart and made to assume a backwardly-inclined position so as to clearly expose the heading of the contents carried thereby.

9. A credit account filing device designed to be longitudinally extended and closed, comprising front and rear end members, provided with sides in the upper portions of which are formed vertical slots; a plurality of supporting members or holders between said front and rear end members and one behind the other; a plurality of levers or bars pivoted together and to the bottom portions of said supporting members or holders; rivets or pins for pivoting the lower ends of the inwardly-extending levers or bars of the end pairs of levers or bars to the lower portions of the sides of said front and rear end members; rivets or pins secured in the upper portions of the outwardly-extending levers or bars of the end pairs of levers or bars and operating in the vertical slots in the upper portions of the sides of said front and rear end members; a plurality of links pivoted to the top of the majority of pairs of the levers or bars and to said supporting members or holders so that as the device is longitudinally extended, the said supporting members or holders will be moved apart and made to assume a backwardly-inclined position so as to clearly expose the heading of the contents carried thereby, and retaining means associated with the said supporting members or holders.

In testimony whereof I have signed my name to this specification in the presence of two subscribing witnesses.

WILLIAM EACRETT.

Witnesses:
L. G. SHARPE,
F. McDERMOTT.